(12) United States Patent
Bueno et al.

(10) Patent No.: US 12,162,226 B2
(45) Date of Patent: Dec. 10, 2024

(54) APPARATUS AND METHOD HAVING MULTIPLE OPERATING MODES FOR FUSING POLYETHYLENE PIPE

(71) Applicant: McElroy Manufacturing, Inc., Tulsa, OK (US)

(72) Inventors: Alex Bueno, Tulsa, OK (US); Shawn Church, Owasso, OK (US); Jessica Meloy, Tulsa, OK (US); Michael Pacheco, Broken Arrow, OK (US)

(73) Assignee: McElroy Manufacturing, Inc., Tulsa, OK (US)

( * ) Notice: Subject to any disclaimer, the term of this patent is extended or adjusted under 35 U.S.C. 154(b) by 0 days.

(21) Appl. No.: 18/107,762

(22) Filed: Feb. 9, 2023

(65) Prior Publication Data
US 2023/0182403 A1    Jun. 15, 2023

Related U.S. Application Data

(62) Division of application No. 17/304,791, filed on Jun. 25, 2021, now Pat. No. 11,602,905.

(51) Int. Cl.
*B29C 65/00* (2006.01)

(52) U.S. Cl.
CPC ........ *B29C 66/967* (2013.01); *B29C 66/5221* (2013.01); *B29C 66/71* (2013.01); *B29C 66/86521* (2013.01); *B29C 66/876* (2013.01); *B29C 66/9221* (2013.01); *B29C 66/9241* (2013.01)

(58) Field of Classification Search
CPC ... B29C 66/967; B29C 66/5221; B29C 66/71; B29C 66/9241
See application file for complete search history.

(56) References Cited

U.S. PATENT DOCUMENTS 6,021,832 A * 2/2000 McElroy, II .......... B29C 66/961
156/359

FOREIGN PATENT DOCUMENTS

CN         214927203 U   * 11/2021

* cited by examiner

*Primary Examiner* — Daniel McNally
(74) *Attorney, Agent, or Firm* — Whitaker Chalk Swindle & Schwartz PLLC; Ephen S. Mosher

(57) ABSTRACT

A butt fusion machine for joining of polyethylene pipe comprises a carriage assembly and a carriage controller disposed in the fusion machine. Programmed instructions stored in a non-volatile memory of the carriage controller control the carriage assembly for selectively operating in at least one of a manual, automatic, and semi-automatic mode of the butt fusion process.

A butt fusion process, after a setup sequence includes (1) selecting a sequence of operating steps of a manual mode, an automatic mode, and a semi-automatic mode; and (2) executing the selected operating mode. The semi-automatic mode includes at least one step requiring intervention by an operator to confirm proceeding to a next step.

7 Claims, 11 Drawing Sheets

APPARATUS AND METHOD HAVING MULTIPLE OPERATING MODES FOR FUSING POLYETHYLENE PIPE

CROSS REFERENCE TO RELATED APPLICATIONS

The present application is a divisional application of U.S. application Ser. No. 17/304,791, filed Jun. 25, 2021 and entitled APPARATUS AND METHOD HAVING MULTIPLE OPERATING MODES FOR FUSING and U.S. patent application Ser. No. 16/545,888 filed Aug. 20, 2019 and entitled METHOD FOR BUTT FUSION OF POLYETHYLENE PIPE.

BACKGROUND OF THE INVENTION

1. Field of the Invention

The present invention concerns pipeline construction and more particularly joining sections of synthetic pipe using heat and pressure to facilitate bonding the ends of the sections of pipe together.

2. Background of the Invention

Polyethylene (PE) pipe is widely used for conveying water and chemicals and other substances in pipeline systems because of its strength, durability, longevity, and ease of forming pipe joints in situ. The industry standard procedures for forming heat-fused joints between the ends of sections of PE pipe include ASTM F2620, ISO 21307, and DVS 2207-1. The most common standard used in North America is set forth in the ASTM F2620.

The overall fusion process for high density polyethylene (HDPE) pipe is well known and has been used for over fifty years. Two pipe ends are joined together through a procedure that involves heating the ends for a given amount of time and then holding them together with a controlled amount of pressure between the two pipes. Pipe fusion equipment ranges in size from fairly small manually operated units to very large equipment complete with its own engine and generator.

Machines for joining or fusing synthetic pipe sections together are typically operated through manual operation of hydraulic valves. Such machines rely on an operator to set the different hydraulic pressure levels that are required to complete the fusion process and to operate the different valves in the correct sequence and timing for the process to be successful. Alternatively, fully automated pipe fusion machines have been developed to control all aspects of the fusion process. These units have various sensors and electronic controls on them to allow for the entire process to be controlled from a central processing unit or controller. Such machines may allow for the operator to manually control the facing and alignment portion of the fusion process—i.e., the initial setup processes—while all other aspects are controlled automatically based on preset time, pressure, and position parameters programmed into the controller.

Some operators, however, are reluctant to use a fully automated pipe fusion machine because they prefer to have control of the fusion process. The alternative is to use a manual fusion process, thus giving them the opportunity to intervene to control the process to perform visual inspection, oversight, or other control steps throughout the fusion process. Such circumstances may occur when a fusion machine is operated to work with different job requirements, different conditions encountered on a particular job, and different skill level of operators without having to change to a different piece of equipment. Further, the manual mode of operation typically contains numerous redundant steps that do not necessarily require operator attention or intervention. Moreover, some portions of the manual processes that are performed between the typical interventions, e.g., when the operator is idle, can lead to errors due to inattention. The manual process may also be less efficient in terms of productivity, where such idle time could be better utilized when assembling a lengthy pipeline, for example.

Accordingly, there exists a need in the industry for a pipe fusion machine that is capable of both manual and fully automated operation yet also allows the operator to select the amount of control needed for the circumstances of a particular job.

SUMMARY OF THE INVENTION

In one embodiment, a butt fusion machine for joining sections of polyethylene (PE) pipe comprises a carriage assembly powered by a hydraulic system embodied in the butt fusion machine; a carriage controller of the butt fusion machine and operatively coupled to a carriage display and to at least one hand-operated control; and programmed instructions stored in a non-volatile memory of the carriage controller to control the carriage assembly for selectively operating in independently selectable manual, automatic, and semi-automatic modes for fusing PE pipe ends together in a heat fusion process.

In one aspect of the butt fusion machine, the semi-automatic mode includes defined intervention steps to enable operator action selected from the group consisting of adjusting at least drag pressure and fusion pressure settings, adjusting temperature settings, and confirming the status of bead up, heat soak, fuse cool, and fusion end steps of the heat fusion process.

In another embodiment, a butt fusion process for joining polyethylene pipe sections comprises the steps of defining a sequence of steps, beginning with a set-up sequence, for execution on a pipe fusion machine under control of a computer program stored in non-volatile memory of a controller coupled to the pipe fusion machine; selecting one of three operating modes of the sequence of steps including a manual node, an automatic mode, and a semi-automatic mode; executing the selected operating mode, wherein selection of the semi-automatic mode includes at least one step of requiring intervention by an operator to confirm approval to proceed with the at least one step in the sequence of steps; and resuming execution of the sequence of steps of the selected operating mode with the confirmed at least one step.

In one aspect of the butt fusion process the step of executing comprises the steps of proceeding through execution of the semi-automatic mode to an intervention step; pausing operation of the computer program; requesting the operator review the status of the pipe fusion machine and the pipe sections loaded therein; and actuating a confirm button on a keypad coupled to the controller upon confirming approval to proceed.

DETAILED DESCRIPTION OF THE INVENTION

Introduction

Figure 1:
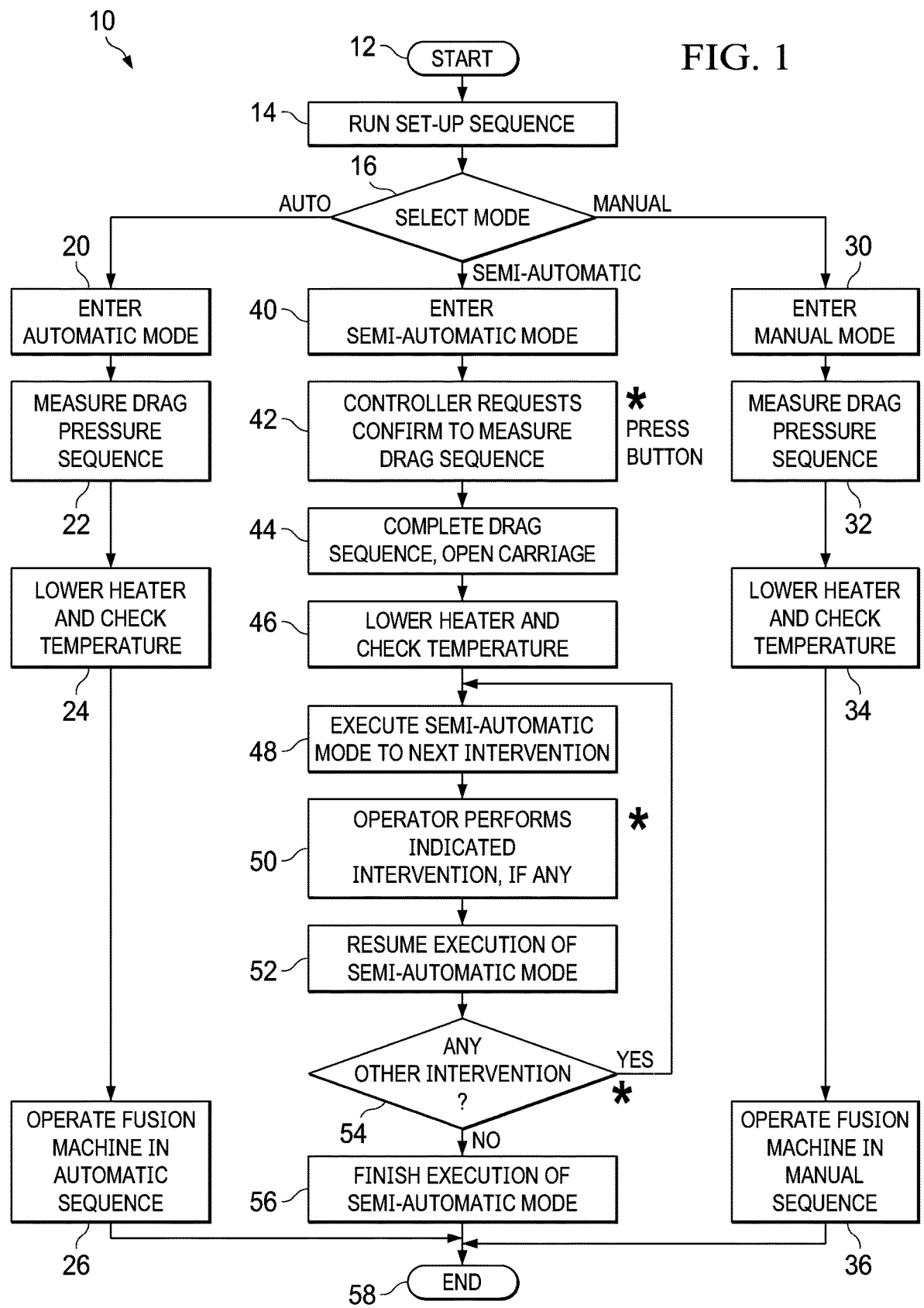
FIG. 1 illustrates a flow chart depicting operation of a butt fusion machine for fusing sections of polyethylene pipe together, in accordance with an embodiment of the claimed invention.

Briefly described, a butt fusion process as described herein provides for joining the ends of sections of PE pipe together under a prescribed "fusion pressure" after the ends of the pipe have been faced smooth and clean, and the faced ends heated so that the molten PE material bonds the ends together into a fused joint. In a typical fusion machine, the fusion pressure is exerted by a hydraulic system because of the ease with which the machine apparatus can apply the required pressure under relatively precise control. The "fusion pressure" thus depends on the characteristics of the hydraulic cylinders used in the machine and other operating factors such as drag—a load factor inherent in the machine and related to the mass of the PE pipe sections. Another important parameter is the "drag pressure," defined as the pressure needed to overcome the inertia of the movable carriage and its load—a section of PE pipe—that supports one of the sections of pipe to be joined. These and other parameters, the operations of the facing and heating devices, and the fusion process may be operated by programmed processors in the fusion machine.

The polyethylene material used in the PE pipe is a semi-crystalline material formed of multiple polyethylene monomers. The material includes regions of moderate to high density molecular chains and amorphous regions of relatively unorganized molecules. The distribution of these regions affects the density and strength of the polyethylene material in a heat-fused joint formed between the ends of adjoining sections of PE pipe. As the polyethylene material is heated, the organized structure breaks down, becoming amorphous as the material melts. As the material cools, the material transitions back to its original, semi-crystalline state. During the butt fusion process to be described, two other important parameters are the heat soak time and the fuse cool time. The heat soak time is the amount of time, usually measured in seconds, for a required melt bead to form at each pipe end from when melting is initially observed until the formed bead reaches a prescribed size and the pipe ends are ready for joining. The fuse cool time begins after the heat source is removed and the pipe ends are joined. The fuse cool time is the period the fused joint is held steady before it can be handled.

In an advance in the state of the art, a heat fusion process for fusing sections of polyethylene pipe end-to-end that is selectable in one of three operating modes is described. The three modes include a manual mode, a new semi-automatic mode, and an automatic mode as illustrated by a system flow chart in FIG. 1. The selection of control of the three distinct modes within one fusion machine provides improved versatility that allows a fusion machine to adapt and work with different job requirements, different conditions encountered on a particular job, and the differing skill level of operators without having to change to a different piece of equipment. Prior art fusion machines limited to either manual or automatic modes are unable to adapt to conditions at a variety of job sites because the manual mode is too operator-dependent or time consuming, or the automatic mode does not permit any pause or intervention for adjustment, confirming completion of an important step in the fusion process, or responding to a problem in the operating sequence.

Specifically, the solution to the problems to be solved in providing an efficient semi-automatic mode compatible with the automatic and manual modes of an existing fusion machine architecture is the configuration of the interface between the operator and the machine appropriate to the level of automation selected by the operator. The interface must be able to monitor the various functions for errors that may occur. The interface must be simple to understand even while enabling error-free control of a variety of elements operative during a complex sequence of operations to perform the heat fusion process to join sections of polyethylene pipe as described herein. The semi-automatic mode thus substantially improves the functionality of the fusion machine.

For example, the automatic mode is very efficient for routine jobs that present a minimum of adverse conditions or unexpected obstacles. However, when the unpredictable or difficult situation occurs, such as movement of the pipe or its slippage within the jaws of the carriage, an automatic fusion process can be very inefficient and may result in repeated interruptions in the process, in lost time, damaged pipe or equipment, or downtime and lost profits. Use of a manual fusion process requiring full-time skilled operators may also be a very inefficient way to execute the fusion process. As an alternative, a semi-automatic process may be the most efficient process for fusing PE pipe sections in a variety of unusual or non-routine circumstances because it includes a number of interventions or pauses in it operating sequence to enable operator attention to selected steps in the process. In some implementations of the semi-automatic mode, the location of the pauses or interventions in the sequence may be revised according to particular conditions or requirements. Accordingly, the addition of a semi-automatic mode to a fusion machine process as described herein meets a long-standing industry need that offers increased productivity in the assembly of pipelines using polyethylene ("PE") sections of pipe.

Realizing that the more complex a machine and its processes are, the more likely is the possibility that modifying an existing machine may present unforeseen obstacles, several approaches to modifying a fully automatic or a fully manual butt fusion machine were considered by the inventors in providing the semi-automatic mode. Accordingly, the present invention incorporates pauses or interventions at specific, limited places in the operational sequence of an automatic machine. It further includes the ability to select the particular operational mode needed early in the sequence and on site, to enable selecting the semi-automatic mode when it is best suited to fusing the pipe sections in a particular circumstance. This strategy also has the advantage of minimizing physical changes to the machine, minimizes changes to the operators' actions during operation of the machine, and provides for pausing briefly to perform certain checks, especially when using the machine to fuse polyethylene pipe sections in unusual circumstances.

A pipe fusion machine for providing a butt fusion process consists primarily of a set of fixed jaws (i.e., first and second pipe clamps) mounted on a frame or bench for holding a first pipe section to be fused, a set of moveable jaws (i.e., third and fourth pipe clamps) for holding a second pipe section to be fused to the first section, a carriage for moving the set of moveable jaws linearly with respect to the fixed jaws, a facer for removing material from the ends of the pipes, and a heater for heating the ends of the pipe at the outset of the heat fusion process. Functional operating power can be provided manually, hydraulically, or electrically with some method to control the amount of force that is placed axially on the pipe. In typical fusion machines this force is provided through hydraulic pressure. The hydraulic pressure may be developed by a pump driven by an internal combustion engine such as a diesel-fueled engine. The pipe fusion machine can be self-propelled on wheels or tracks, thereby forming part of an integrated vehicle system as in the present illustrated embodiment, or moved around by a separate vehicle or another piece of equipment.

In the following specification, a mobile butt fusion machine suitable for practicing the present invention embodying three selectable fusion processes is described herein. The butt fusion machine (Ref. No. 350 in FIG. 7, and Ref. No. 500 in FIGS. 8 and 9) is configured to support the ends of polyethylene pipe sections to be joined together, providing a permanent joint through a process that faces the ends of the pipe sections, heats them to a prescribed temperature, presses them together under a prescribed pressure for a predetermined time to bond the ends of the pipe sections together, and allows the fused joint to cool for a prescribed time before releasing the pressure and decoupling the machine from the joined pipe. One example of such a fusion machine 500, illustrated in FIGS. 8 and 9 may be selectively operated to join the ends of polyethylene ("PE") pipe using either of three modes depending on the needs and conditions at a particular site or installation. The ability of a single machine to select, even for each joint to be fused, a semi-automatic mode in addition to the conventional manual or automatic modes, is heretofore an unmet need in the industry. The fusion machine described herein thereby expands the operative versatility and productivity of butt fusion operations.

Three Modes Operable in One Fusion Machine—an Overview

Figure 8:
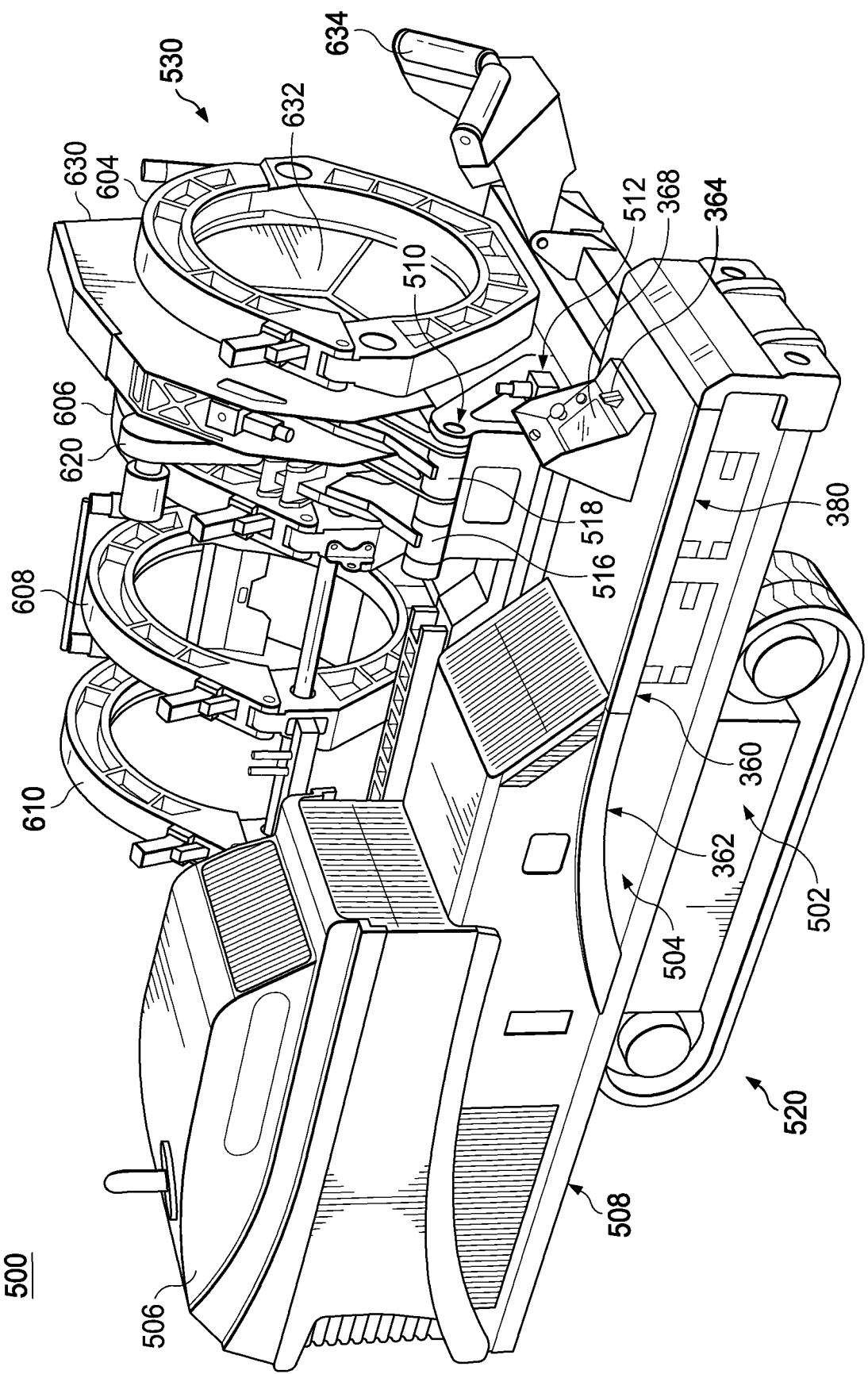
FIG. 8 illustrates a pictorial view of the vehicle (engine) side of one embodiment of a butt fusion machine for practicing the claimed invention.
Figure 9:
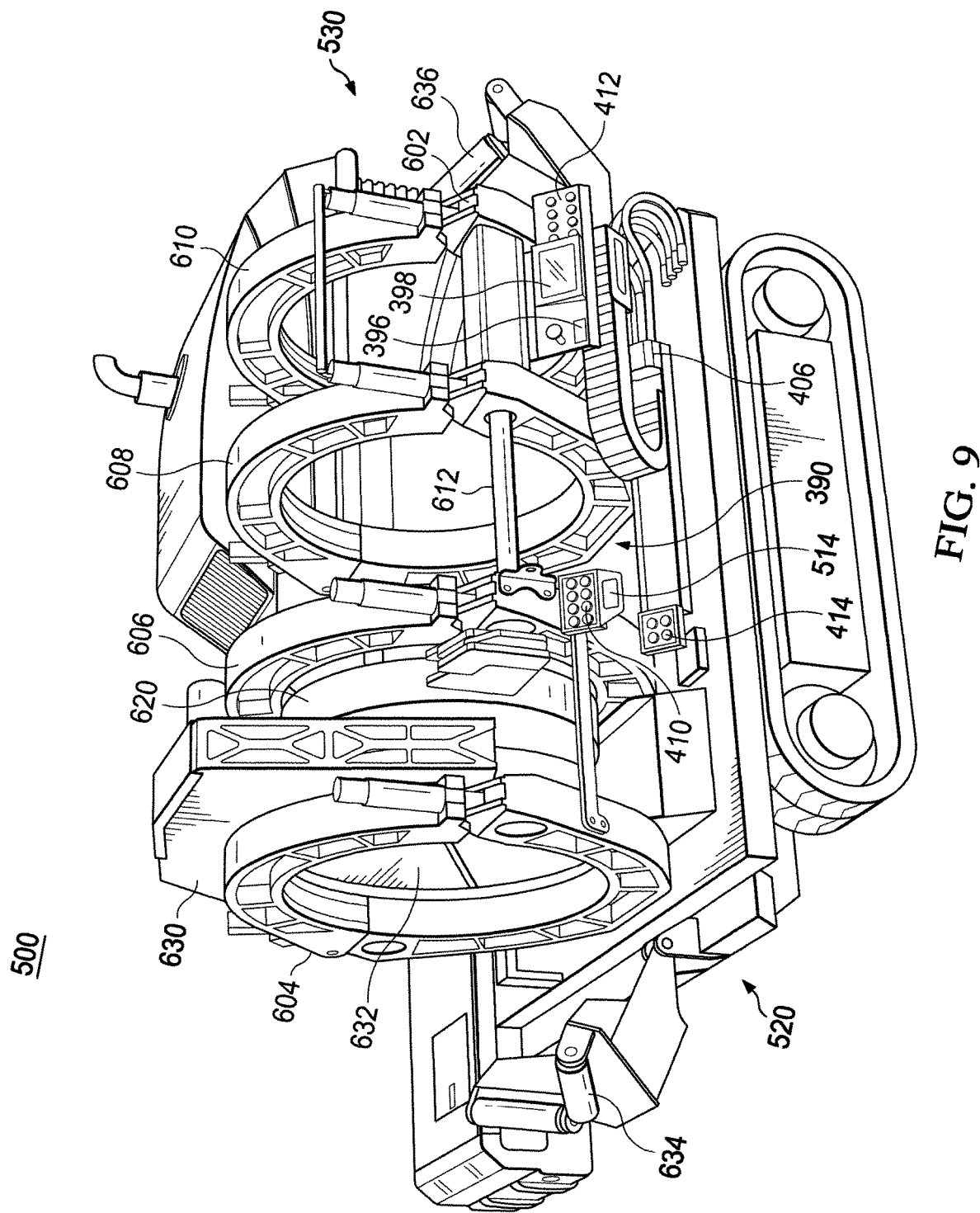
FIG. 9 illustrates a pictorial view of the carriage side of the embodiment of FIG. 8 of a butt fusion machine for practicing the claimed invention.

One example of a fusion machine 500 adapted to practice the present invention is illustrated in FIGS. 8 and 9 to be described. The machine illustrated can be configured to fuse polyethylene pipe having an outside diameter (O.D.) of 12 inches (305 mm) to 36 inches (914 mm). Other versions of the machine can be configured to fuse pipe having an O.D. of 8 to 24 inches, or 16 to 48 inches. Fusion machines capable of practicing the methods described herein can be readily adapted or configured for a variety of PE pipe diameters.

Figure 2:
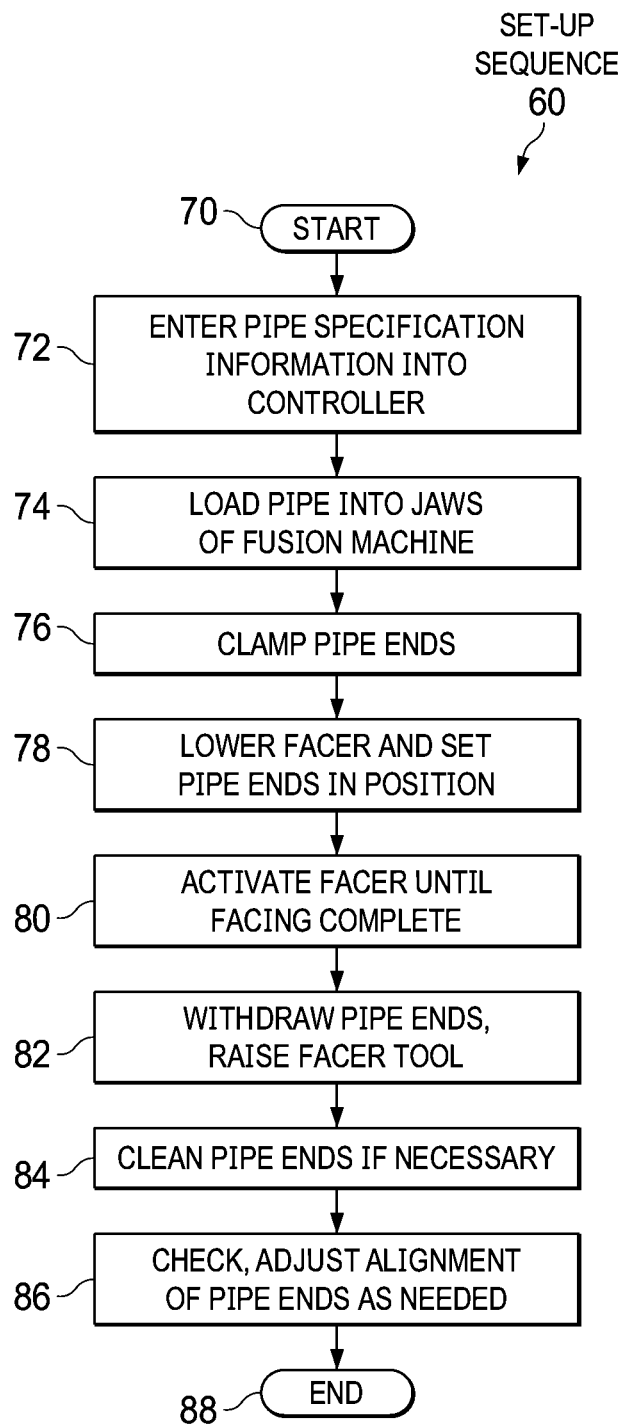
FIG. 2 illustrates a flow chart for a setup process for use with the butt fusion machine of FIG. 1 in accordance with an embodiment of the claimed invention.
Figure 3:
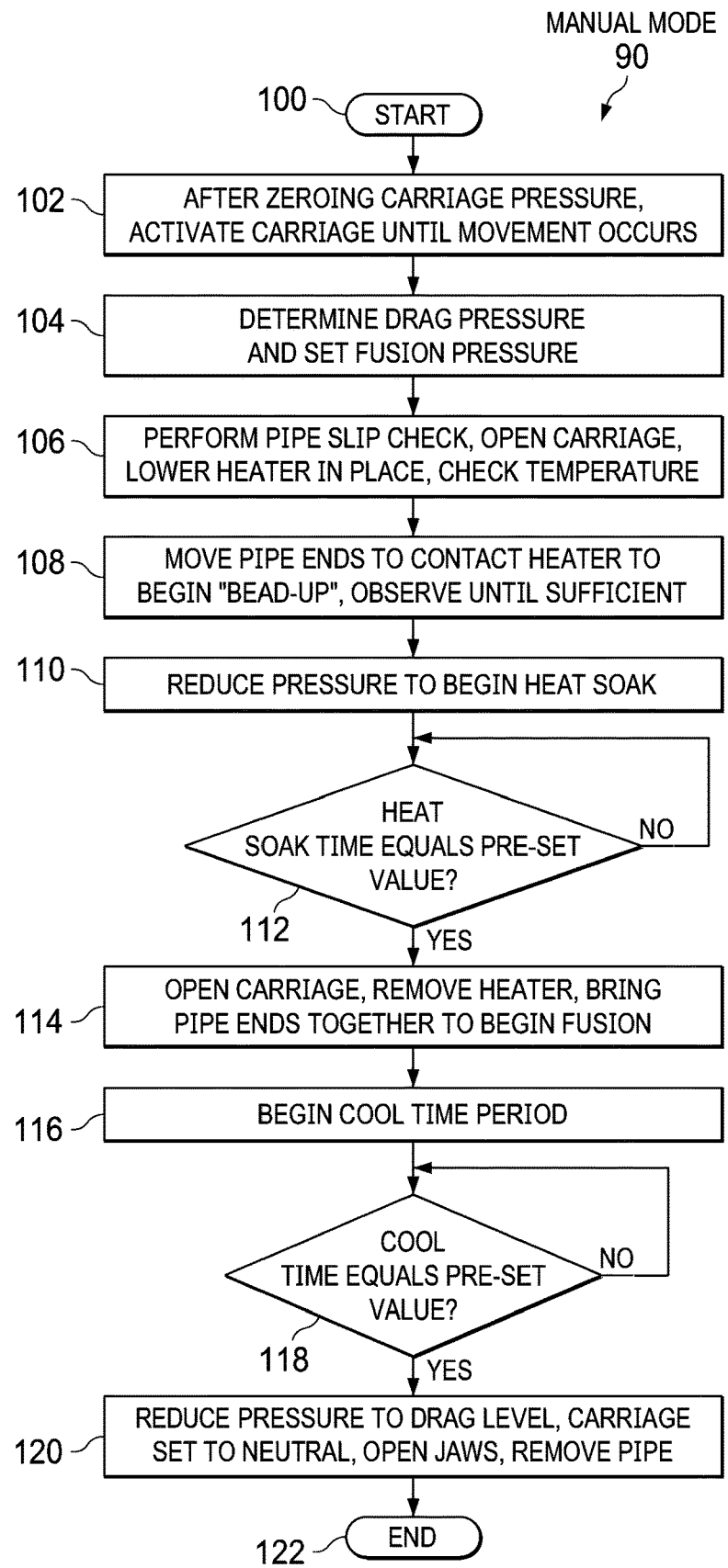
FIG. 3 illustrates a flow chart for a manual mode sequence for operating the butt fusion machine of FIG. 1 in accordance with an embodiment of the claimed invention.

FIG. 1 illustrates an overall operational flow chart 10 for a butt fusion machine configured to operate in any one of three selectable modes of operation, automatic, semi-automatic, and manual. In the process flow chart 10, which begins at step 12 in FIG. 1, following a pipe setup sequence of FIG. 2 (described below) in step 14, the operation proceeds to step 16 to select one of an automatic, semi-automatic, or manual mode. After selecting a mode, the process flow enters the selected mode at step 20, 30, or 40, followed by setting an important initial condition in each of the selected modes. This important initial condition is the drag pressure in the respective steps 22, 32, or 42. This measurement is required each time the set-up process of FIG. 2 is performed. The procedure to perform the drag pressure measurement in step 42 for the semi-automatic mode is described in detail in FIG. 4A to be described. The procedure to perform the drag pressure measurement in step 22 for the automatic mode is described in detail with reference to FIG. 4B. Setting the drag pressure in the manual mode is described with FIG. 3.

Drag pressure is the pressure exerted by the hydraulic system to overcome the resistance to motion of the carriage due mainly to the inertial mass of the carriage assembly as it moves along its rails and the load of the pipe it is holding. Briefly, the procedure for determining the drag pressure is performed as follows. It is measured in psig, or PSI gage, which is defined as the gage pressure in the hydraulic lines, in pounds per square inch relative to the atmospheric pressure of the air outside of the hydraulic lines. The drag pressure may be measured by increasing the hydraulic pressure in the carriage cylinders until the carriage begins to move, then back off the hydraulic pressure until the gage pressure corresponding to when the carriage is barely moving is indicated on the carriage display. In some embodiments, a separate pressure gage (not shown) connected to the hydraulic lines may be used to indicate the drag pressure measurement.

Continuing with FIG. 1, the heater is lowered in steps 24 or 34 of the respective automatic or manual modes between the pipe ends and the temperature of the heater is checked before proceeding with the selected fusion procedure. In the following steps 26 or 36, the machine is advanced to operate the fusion machine in the appropriate sequence for the automatic or manual modes as described in FIGS. 6 and 3 respectively to be described.

Figure 4A:
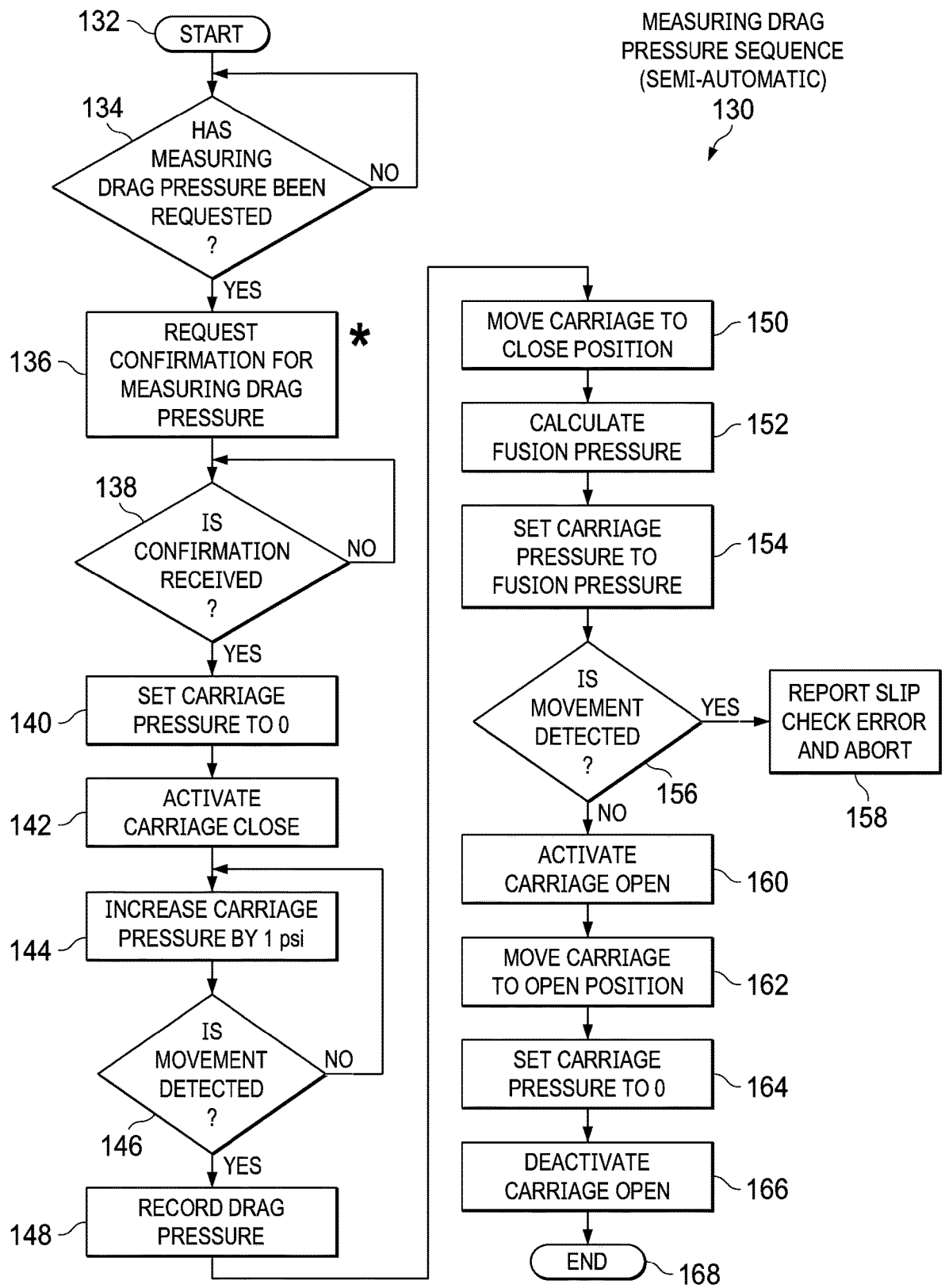
FIG. 4A illustrates a flow chart of a semi-automatic sequence for measuring drag pressure on the butt fusion machine described in FIG. 1, in accordance with an embodiment of the present invention.
Figure 5A:
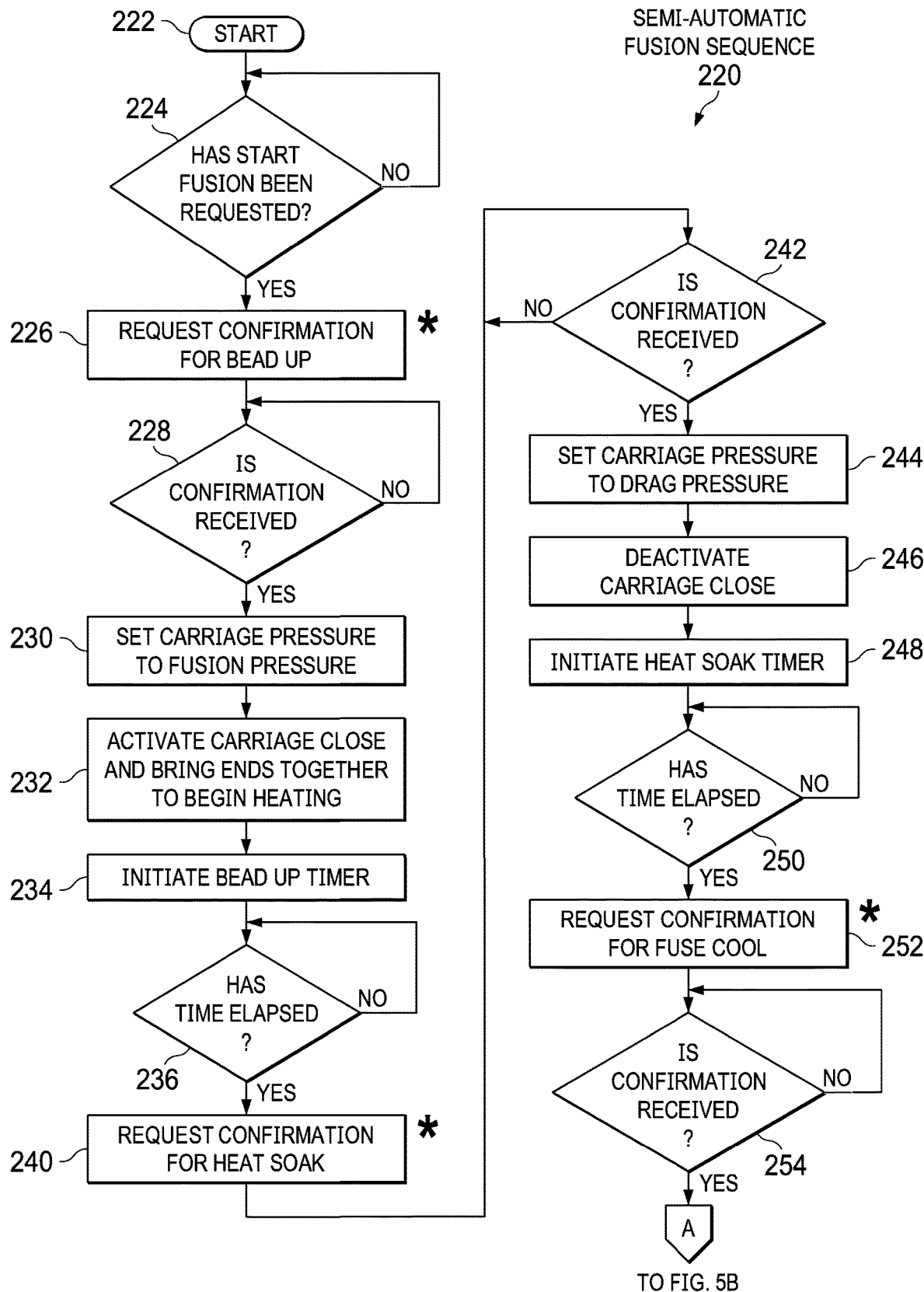
FIG. 5A illustrates a flow chart for a first operative portion of a semi-automatic sequence of the butt fusion machine described in FIG. 1, in accordance with an embodiment of the present invention.
Figure 5B:
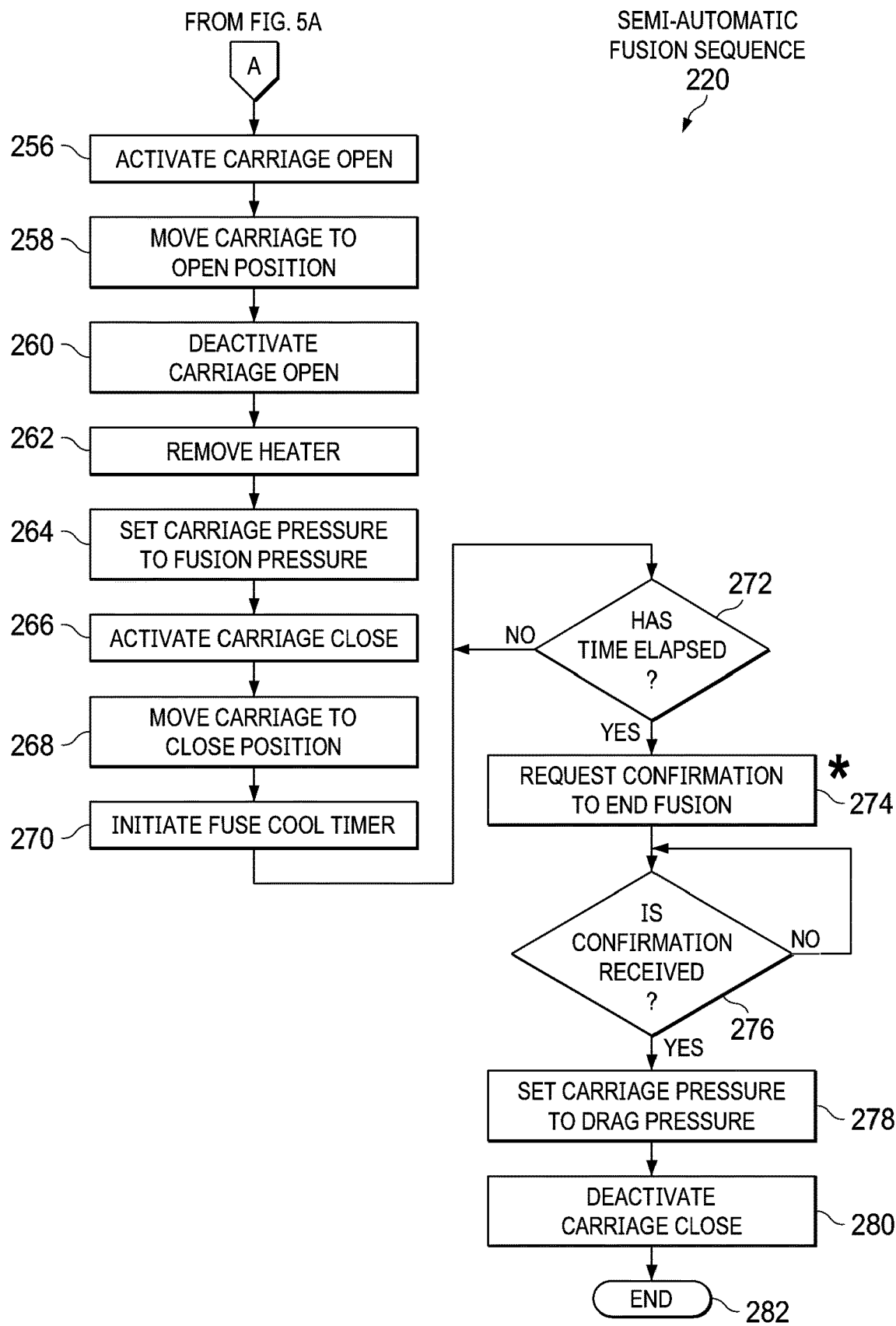
FIG. 5B illustrates a flow chart for a second operative portion of the semi-automatic sequence of the butt fusion machine described in FIGS. 1 and 4A, in accordance with an embodiment of the present invention.

The semi-automatic mode 220, to be described in detail with reference to FIGS. 5A and 5B, is similar to the automatic mode 300 of FIG. 6, except that, after the semi-automatic mode is entered in step 40 of FIG. 1, the controller, in this example, pauses to request the operator to confirm, by pressing a button on the machine, to proceed with measuring the drag pressure sequence. The semi-automatic mode 220 is characterized by providing steps for the operator to intervene at certain points in the fusion process, usually to respond to a request to confirm a set-up or operating condition or step before any movement of the carriage assembly of the machine occurs. Such pauses may also be used to check the timing or status of a critical step, make an adjustment, or perform some manual step. The interventions, e.g., as in step 42 of FIG. 1, are indicated by an asterisk * in the flow diagrams of FIGS. 4A, 5A, and 5B.

In some applications, other intervention steps may be included in the semi-automatic process. In other examples, an intervention may occur in association with a timed step, as in steps 138, 146 or 156 in FIG. 4A to be described. The opportunity to pause and intervene during the process allows the fusion machine to accommodate nearly any unusual condition that may be encountered and corrective action to be taken, for example before damage is done or an inappropriate action occurs that would spoil a joint, or injury to an operator might occur. The semi-automatic mode thus provides a way to intervene that is more efficient than the use of a strictly manual mode that proceeds step-by-step, where opportunities to intervene are provided after every step, whether needed or not.

Continuing with FIG. 1, a principal reason for requesting operator confirmation at certain points in the process flow is to provide a check point to ensure that the machine set-up sequence and the machine settings during the fusion process are correct for the particular pipe parameter values to be processed. Upon confirmation in step 42 of the semi-automatic mode 40, the operator presses the button marked by an asterisk * and the flow advances to step 44 to measure the drag pressure sequence as shown in FIG. 4A to be described. The flow in FIG. 1 advances to step 46 to lower the heater and check its temperature before proceeding to execute step 48 of the semi-automatic mode to the next intervention in step 50. At step 50 the operator may re-check machine settings if any are needed. For example, step 50 may include an intervention to inspect the pipe to ensure alignment, facing, bead-up, and temperature settings are correct. Following step 50, the operator has an opportunity after step 52 to consider whether any other intervention is needed in step 54. If yes, the flow re-enters step 48 to repeat a portion of the process. If no, that there are no other interventions needed, the flow proceeds to finish the semi-automatic butt fusion of the pipe joint in step 56 and the process ends at step 58.

The processes depicted in FIGS. 1-6 may preferably be implemented according to computer programs stored in non-volatile memory within the vehicle, engine, and carriage controllers. These controllers may be installed in the fusion machine and configured by these programs to perform the processes as described herein. The controllers may be implemented by means well-understood by persons skilled in the art using, for example, microcontrollers equipped with the memory and interface elements, as well as the operative program(s) appropriate for the control functions as described in FIGS. 1-6.

Pipe Setup

FIG. 2 illustrates a set up sequence 60 for entering the initial steps to be performed in the pipe setup portion of the process, before selecting the particular operating mode in step 16 of FIG. 1. The setup sequence 60 (depicted in step 14 of FIG. 1) begins as shown in FIG. 2 at step 70. The process proceeds by entering pipe specification information at step 72 into the carriage display 398 (See FIG. 7) of the fusion machine 350. The pipe specification information may include the pipe diameter and wall thickness, the particular pipe type (i.e., whether high density PE or other property related to the specific formula of the PE material), and other parameters such as the ambient temperature, the particular fusion standard used to govern the fusion process, specific timing intervals, etc.). Next, in step 74 the pipe sections are loaded into the fixed jaws or pipe clamps 604, 606 (FIGS. 8 and 9) and movable jaws or pipe clamps 608, 610 and clamped down in step 76 to secure them. The pipe sections may be supported in correct alignment by the first 634 and second 636 pipe lifts as shown in FIGS. 8 and 9. The facer for the machine is lowered and inserted between the two ends of the pipe sections to be fused in step 78.

Continuing with FIG. 2 in step 80, the facer may be activated and the ends of the pipe brought in contact with the facer as it rotates to remove some material from each pipe end to ensure two flat, smooth, and parallel surfaces with fresh material for the fusion joint. In general, for straight pipe sections, the pipe ends as surfaced should be perpendicular to the longitudinal axis of the pipe sections. As the pipe ends are withdrawn from the facer after completion of step 80 they may be checked to make sure they are in proper alignment with each other after fully retracting the facer in step 82. In some embodiments the ends of the faced pipe ends may be cleaned in step 84 by means well-known in the art to ensure a clean surface for the fusion process. An adjustment may be made as necessary in step 86 to achieve proper alignment. The set-up process ends in step 88. All of these set-up steps may be completed manually by the operator regardless of which mode of operation that is chosen on the machine.

Manual Fusion

Manual operation of the unit will be described first to provide a baseline for the other two modes. In the manual operation depicted in FIG. 3 with the pipe ends apart, the manual mode 90 begins with step 100 and advances to step 102. In step 102 the operator reduces the pressure on the carriage to near zero, actuates the carriage, and increases the pressure until movement of the carriage occurs to begin determining the drag pressure setting and the fusion pressure in step 104. Depending on the pipe that is being fused and the standard that is being used for the butt fusion process, the fusion pressure is then set by the operator by adjusting the pressure control on the fusion machine to the specified pressure level. Next, a pipe slip check is conducted in step 106 at fusion pressure to ensure that the pipe does not slip in the jaws, the carriage is opened to separate the pipe ends, the heater is lowered into place between the two pipe ends, and the heater is checked to make sure it is at the appropriate temperature.

In step 108, the operator moves the pipe ends into contact with the heater at the prescribed fusion pressure to begin the "bead up" portion of the process. Completion of the "bead up" portion of the process may be based on the temperature of the heat plates of the heater and a certain size of the bead on the pipe ends, typically achieved after a specified amount of time that may be entered by the operator. Once a suitable bead is achieved, the hydraulic pressure is reduced in step 110 to the drag pressure and the carriage is shifted to neutral to begin the "heat soak" portion of the process with the pipe ends in contact with the heat plate. The "heat soak" portion of the process is set for a preset time period that depends on the pipe that is being fused and the standard that is being used. Once this preset time period is complete in step 112, the operator opens the carriage in step 114 to retract the heater, and operates the carriage to bring the pipe ends back together to fuse the pipe joint at fusion pressure and begin the "fuse cool" or cool time portion of the process in step 116.

The "fuse cool" portion of the process is again a pre-set amount of time that depends on the characteristics of the pipe that is being fused, its material composition, and the standard that is being used. After this preset time in step 118, the operator returns the pressure level to drag pressure in step 120 and places the carriage in neutral so that the jaws can be opened, and the pipe removed from the jaws. The manual mode 90 ends in step 122, and the machine may be reset to start the fusion process of the next PE pipe joint.

Regarding the preset time periods in steps 112 and 118, if the time period has not yet elapsed, the flow returns to the beginning of the respective step 112 or 118 to allow the timer to time out to the preset value.

Measuring the Drag Pressure and Setting the Fusion Pressure in the Semi-Automatic and Automatic Modes The drag pressure of the fusion machine is performed to establish the initial condition for setting the fusion pressure for the particular pipe to be joined. The drag pressure measurement process is illustrated in the flow chart of FIG. 4A for the semi-automatic mode and 4B for the automatic mode. The drag pressure measurement sequence is performed after the set-up sequence (FIG. 2) and the mode selection (step 16 in FIG. 1) have been completed. Briefly, in the selected operating mode, after receiving confirmation to measure the drag pressure, the carriage that moves the movable jaws is actuated, and the pressure increased until movement of the carriage begins. In the semi-automatic and automatic modes, the hydraulic pressure required for the carriage to begin to move is measured to determine the drag pressure setting. Depending on the pipe that is being fused and the standard that is being used for the fusion, the fusion pressure is then calculated and set by the controller by adjusting the pressure control on the carriage to the appropriate pressure level for the particular pipe to be joined. A slip check of the pipe is then conducted at fusion pressure to ensure that the pipe does not slip in the jaws. Once this step is completed, the carriage is opened, ready to begin the selected operating mode.

For the semi-automatic mode, the process for setting the drag pressure and fusion pressure in FIG. 4A begins at step 132, followed by steps 134 through 138 to confirm receipt of a request to measure the drag pressure. The carriage pressure is set to zero (140), the carriage close function is activated (142), and the pressure increased by 1 lb./sq. in. or psi. If movement is not detected, the process repeats step 144. If movement of the carriage is detected in step 146, the pressure setting is recorded as the drag pressure in step 148 and the carriage moved to the closed position in step 150 to bring the faced pipe ends in contact. At this point, the fusion pressure is calculated in step 152, the carriage pressure set to the calculated fusion pressure in step 154, and the carriage observed to determine whether movement is detected in step 156. If movement, i.e., slip is detected, the slip is reported, the procedure aborted, and the error reported in step 158. If no slip is detected at step 156, the flow advances to step 160 to activate the carriage and move it to the open position in step 162. Then the carriage pressure is set to zero in step 164 and the carriage deactivated in its open position at step 166. The procedure ends at step 168 to await the subsequent steps beginning at step 222 in FIG. 5A and proceeding through FIG. 5B.

Figure 4B:
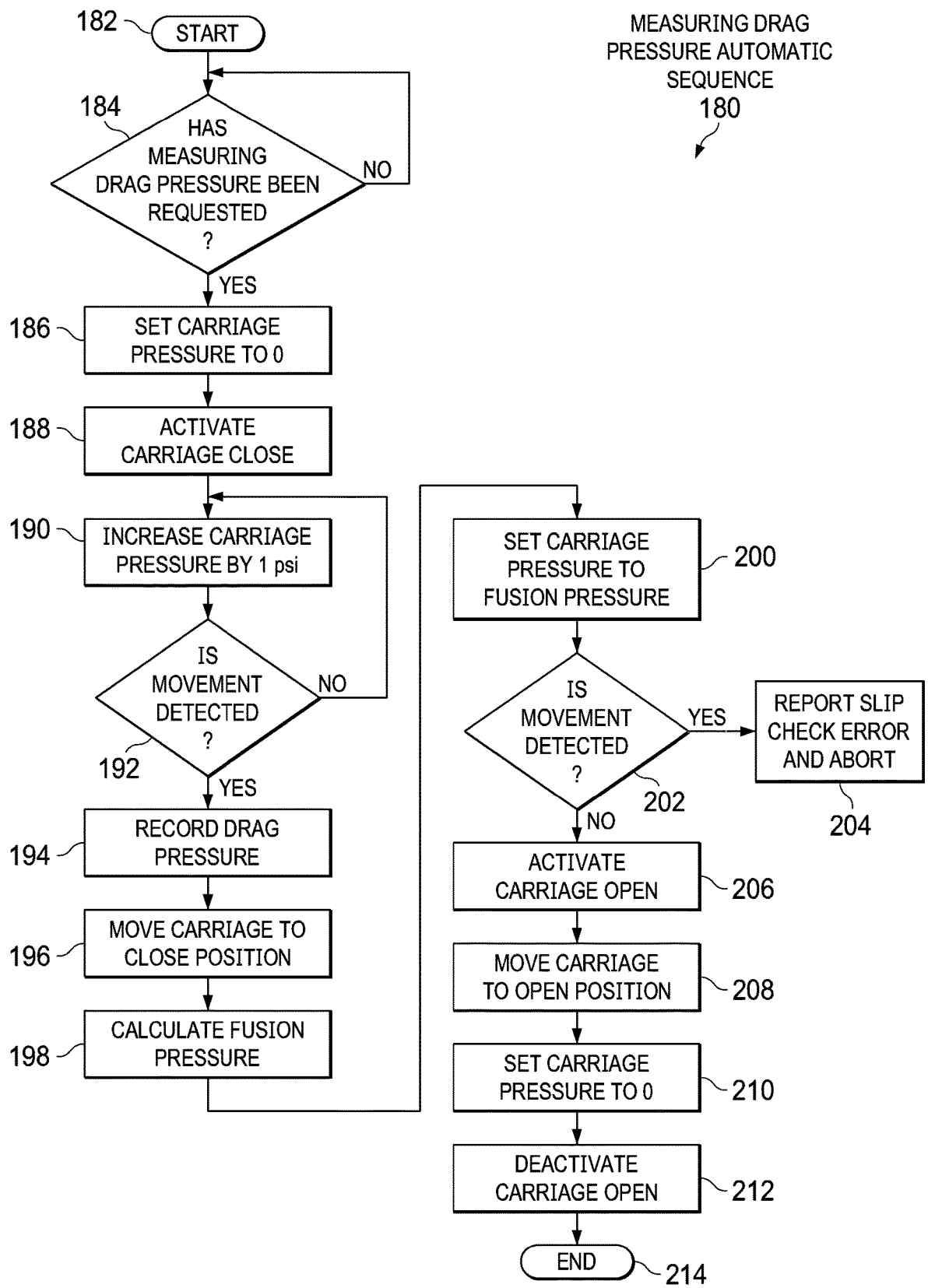
FIG. 4B illustrates a flow chart of an automatic sequence for measuring drag pressure on the butt fusion machine described in FIG. 1, in accordance with an embodiment of the present invention.

The procedure for setting the drag pressure and fusion pressure in the automatic mode described in FIG. 4B is similar to FIG. 4A except that the confirmation steps 136 and 138 of FIG. 4A are omitted, as described in FIG. 1 at step 42. The process for FIG. 4B begins at step 182, receives confirmation to measure drag pressure at step 184, sets the carriage pressure to zero at step 186, the carriage close function is activated (188), and the pressure increased by 1 psi in step 190. If movement is not detected in step 192 the process repeats step 190. If movement of the carriage is detected in step 192, the drag pressure setting is recorded in step 194 and the carriage moved to the closed position in step 196 to bring the faced pipe ends in contact. At this point, the fusion pressure is calculated in step 198, the carriage pressure set to the calculated fusion pressure in step 200, and the carriage observed to determine whether movement is detected in step 202. If movement, i.e., slip is detected, the slip is reported, the procedure aborted and error reported in step 204. If no slip is detected at step 202, the flow advances to steps 206 to activate the carriage and move it to the open position in step 208. Then the carriage pressure is set to zero in step 210 and the carriage deactivated in its open position at step 212. The procedure ends at step 214 to await the subsequent steps beginning at step 302 in FIG. 6.

After the pipe setup and drag pressure operations are complete, the pipe fusion process can begin. The sequence of steps for the pipe fusion process will generally be similar for all three modes of operation, but they may differ in how they are initiated or triggered to move from one step to the next. The operation to fuse the pipe sections together after the setup process begins by operating a selector to select the operating mode for performing a particular fusing operation.

Semi-Automatic Fusion

In the semi-automatic process 220 to be described with the aid of FIGS. 5A and 5B, certain subsets of the sequence are automated under the control of a controller so that the operator does not have to perform or monitor them each time as required in a manual process. These subsets may be completed without attention in a fully automatic process that may proceed without the attendance or intervention of an operator. A machine with semi-automatic operation provides the ability to pause during the sequence to confirm it is operating correctly before advancing to the next step, to confirm a process step, to make adjustments as necessary, or to intervene to correct a problem. These interventions provide the capability of ensuring an optimum outcome, particularly in unusual operating conditions.

The controller used in the semi-automatic mode may be a computer operating according to a program stored in a non-volatile memory associated with the controller or computer. A display and a keyboard or keypad coupled to the controller may be provided for entering information or commands, operator settings, etc. For example, see the description below for FIGS. 8 and 9. The display may include a touch sensitive keypad in lieu of or in addition to a keyboard. The operator enters the information about the pipe being fused and the standard being used so that the controller can apply the correct times to use and how to calculate the pressure. In some implementations hand operated controls are used to operate certain devices or structures.

The semi-automatic fusion process 220 follows similar steps as the manual or automatic sequences, except when the controller pauses to require the operator to intervene and to provide an input or confirm that the machine can proceed to the next step of the process. This can be accomplished in multiple ways but for the sake of this description, it may be accomplished by pressing or actuating a specific button on an electronic keypad or keyboard, either on the fusion machine itself or on a remote device such as a wireless transmitter. As with the automatic mode, the operator must enter in the information about the pipe being fused and the standard being used. As illustrated in FIGS. 5A and 5B, after completing the pipe setup process depicted in FIGS. 1 and 2, and the drag pressure is measured and set as in FIG. 4A or 4B, the operator opens the carriage and lowers the heater into place to initiate the pipe fusion process.

Turning now to FIG. 5A, the semi-automatic process 220 starts at step 222. After step 224 to verify receipt of a request to start the fusion process, the controller requests confirmation to "bead-up" in step 226—i.e., to initiate the fusion process—and the operator presses the confirmation button as indicated by the asterisk *. Step 228 is repeated until confirmation is received. When confirmation is received, in step 230 the controller sets the carriage pressure to the fusion pressure setting. In step 232 the controller activates the carriage to close it and bring the pipe ends into contact with the heater to begin heating them. Then the bead-up timer is initiated in step 234 and the timer runs in step 236. When the bead-up timer has timed out the controller requests confirmation in step 240 at an intervention * to confirm ready to begin the heat soak portion of the process. At this point, the operator can look at the size of the bead to ensure it is in compliance with the appropriate standard before pressing the confirmation button.

After receipt of confirmation in step 242 to begin the heat soak portion of the process, the carriage pressure is set to the drag pressure setting in steps 244, the carriage close step 246 is deactivated, and the heat soak timer initiated and timed out in steps 248 and 250. As in the manual fusion process, the "heat soak" portion of the process is set for a preset time period (step 250) that depends on the pipe that is being fused—its diameter, wall thickness, and material formulation—and the standard that is being used. Once this preset time period is completed in step 250 it is confirmed per the request * in steps 252 and 254, and the process advances to FIG. 5B.

In FIG. 5B the controller opens the carriage in steps 256 through 260, removes the heater from between the pipe ends in step 262, and brings the pipe ends back together at fusion pressure in steps 264 to 268 to begin fusing the heated pipe ends together. The fusion is timed by a fuse cool timer in steps 270 to 272 to regulate the "fuse cool" or cool time portion of the process. At step 274 the controller requests per * confirmation to end the fusion process at the end of the prescribed cool time set by the fusion cool timer in steps 270 to 272 according to the specification for the particular pipe. Upon receipt of the confirmation in step 276, the carriage pressure is set to drag pressure in step 278 and the carriage deactivated in step 280. The semiautomatic fusion sequence ends at step 282.

Automatic Fusion

Figure 6:
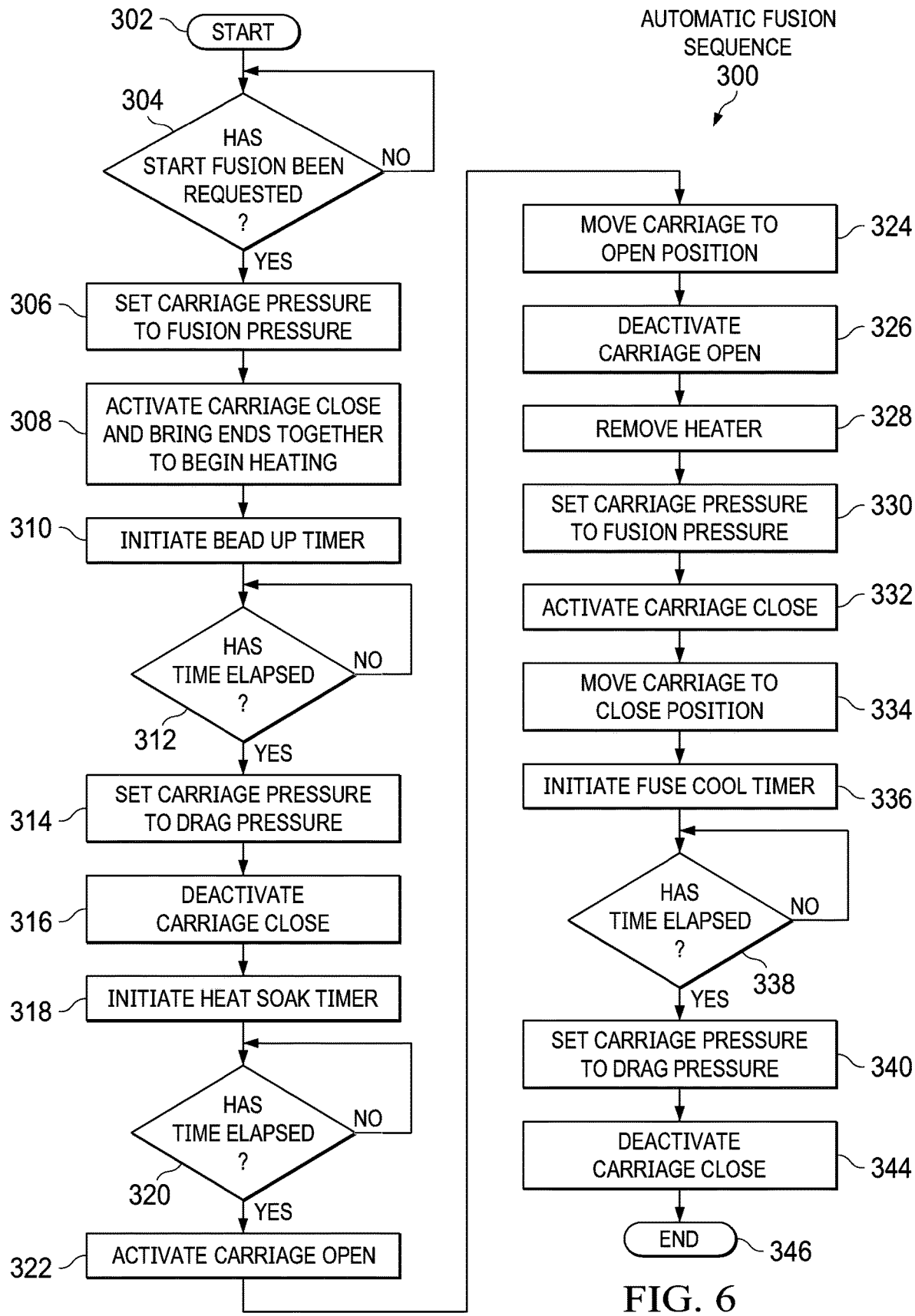
FIG. 6 illustrates a flow chart for an automatic sequence of the butt fusion machine described in FIG. 1, in accordance with an embodiment of the present invention.

In a fully automatic mode illustrated in FIG. 6, the fusion process basically follows the same steps as in the manual or semi-automatic sequences, but a program in the controller actuates the functions and switches the pressure levels on the unit according to the time, pressure, and pipe specifications applicable to the particular pipe to be joined. The controller may be a computer operating according to a program stored in a non-volatile memory associated with the controller or computer. A display and a keypad or keyboard coupled to the controller may be provided for entering information or commands, operator settings, etc. For example, see the description below for FIGS. 8 and 9. The display may include a touch sensitive keypad in lieu of or in addition to a keyboard. The operator enters the information about the pipe being fused and the standard being used so that the controller can apply the correct times to use and how to calculate the pressure.

The automatic fusion process 300 begins after the pipe setup process is completed (as in FIG. 2), the automatic mode is selected (FIG. 1 at step 16), and the drag pressure measurement (as in FIG. 4B) is performed. Next, the controller determines the required fusion pressure, closes the carriage at fusion pressure to perform a slip check, and then opens the carriage. The operator lowers the heater into place before the flow advances to FIG. 6.

Beginning with FIG. 6 at step 302 and determining that the "start fusion" in step 304 has been requested, the carriage pressure is set to fusion pressure in step 306. Step 306 may include a heater temperature check in preparation to activate the close carriage operation in step 308 to bring the pipe ends into contact with the heater to begin the fusion process and initiate the bead-up timer in step 310. After the timer times out in step 312, and once the prescribed time has elapsed and the correct bead profile achieved in step 314, the controller adjusts the pressure to drag pressure and shifts the carriage to neutral in step 316 to begin the "heat soak" portion of the process and initiate the heat soak timer in step 318.

When the prescribed heat soak time has elapsed in step 320, the controller opens the carriage in steps 322 to 326, removes the heater from between the pipe ends in step 328, and closes the carriage at fusion pressure to bring the pipe ends together in steps 330 to 334 to fuse the heated pipe ends to form the butt-fused joint. At this point the fuse cool timer is initiated in step 336, times out in step 338 to complete the "fuse cool" portion of the process. After the prescribed time has elapsed in step 338 to allow the fused joint to cool sufficiently to be handled, the controller adjusts the pressure to drag pressure in step 340 and shifts the carriage to neutral to deactivate the carriage in step 344 to complete the automatic fusion process 300, which ends at step 346.

The Fusion Machine

Figure 7:
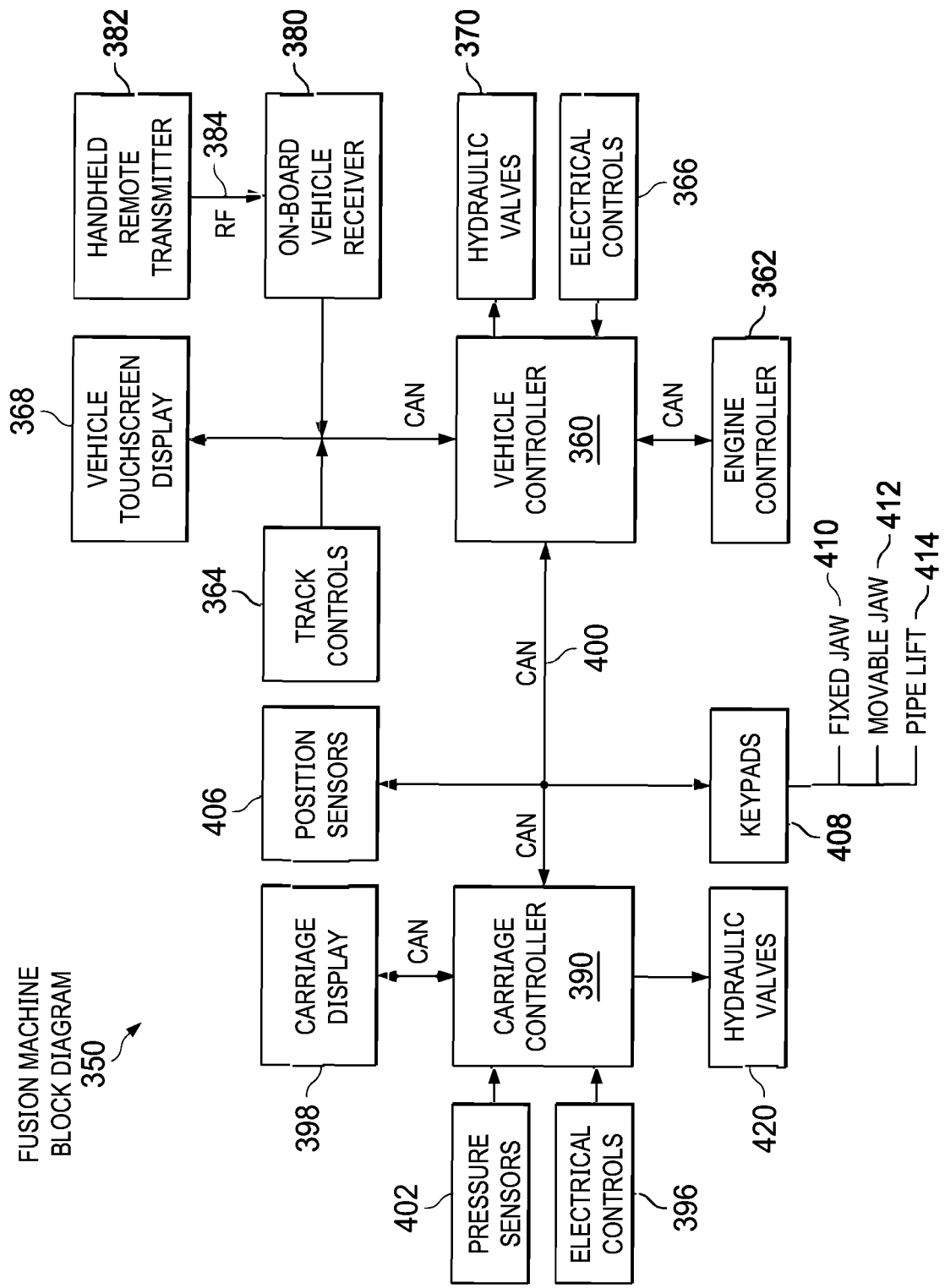
FIG. 7 illustrates a block diagram of a butt fusion machine system configured for operating according to the embodiments depicted in FIGS. 1 through 6.

FIG. 7 illustrates a block diagram of a mobile butt fusion machine system configured for operating according to the embodiments depicted in FIGS. 1 through 6. One illustrative example of a preferred embodiment of a butt fusion machine for practicing the present invention is depicted in FIGS. 8 and 9 to be described. It should be understood that the methods described herein are not limited to use on the exemplary machine depicted in FIGS. 8 and 9. The methods can be provided on any machine that can be configured as described herein to selectively perform the three modes of operation of a butt fusion machine for joining polyethylene pipe sections to form a pipeline. Thus, the present invention may be implemented in a variety of machine configurations without departing from the concepts illustrated and described herein.

The fusion machine 500 of FIGS. 8 and 9 depicts one example of the fusion machine 350 described herein in FIG. 7. There are two principal sections of the illustrated fusion machine 500, a vehicle section 520 and a carriage assembly section 530. The vehicle section 520 includes an engine, hydraulic pump and valves, tracks (or wheels in some embodiments) for mobility, and an engine controller and associated controls, including, on some versions, a handheld, remote control apparatus. The carriage assembly section 530 includes the pipe handling apparatus, hydraulic valves, sensors, a carriage controller and associated controls. The carriage assembly 530 may be operatively moved into position by the vehicle section 520.

The vehicle controller 360 and the carriage controller 390 may be connected to each other via a controller area network (CAN). Links within the CAN may preferably be wired. A plurality of position sensors and keypads may also be connected to the CAN. A carriage display may be connected via a two-way CAN link to the carriage controller. The two-way link permits a touch sensitive keypad on the display to provide inputs to the carriage controller. Pressure sensors and electrical controls may be connected to the carriage controller. The vehicle controller may be operatively connected to hydraulic valves, track controls, etc. for controlling the movement of the vehicle responsive to inputs from electrical controls. The vehicle controller may be operatively connected to an engine controller. A vehicle display may be connected to the CAN via two-way links. The carriage controller may be operatively connected to hydraulic valves for controlling the carriage of the fusion machine responsive to inputs based on the position and pressure sensors and the electrical controls. The vehicle controller 360, the engine controller 362, and the carriage controller 390 may be powered by current from a 12-volt battery located within the engine controller. Onboard 5-volt DC power supplies may be located on each controller and used to operate sensors and other electrical control devices in the fusion machine 500.

The fusion machine 500 selectively provides all three operating modes within the same unit without requiring additional sensors, controls, or other input devices. While this implementation of the invention involves a combination of operator interaction with both the touch display and electronic keypad, it is possible that it could be done with either interface being the only method of operator control. Additionally, all of the information on the machine may be communicated via the wired controller area network (CAN) interface. It is also possible to communicate this information through serial communication, analog signals, and other methods of transferring data. The pipe fusion machine may be stationary, wheeled, or tracked, but may require electronic control of the various pipe fusion functions.

Referring to FIG. 7, a block diagram schematic of the butt fusion machine 350 configured to practice the invention described herein is illustrated. The block diagram of the machine 350 includes the hydraulic, sensors, electrical, and electronic components connected in a controller area network (CAN) 400. The controller area network (CAN) 400 includes a vehicle controller 360. Connected to the vehicle controller 360 are an engine controller 362, track controls 364, electrical controls 366, a vehicle display 368 and hydraulic valves 370. Operative control of the vehicle section 520 may be entered using the track controls 364 or the electrical controls 366, or the touchscreen vehicle display 368. In some implementations, an on-board vehicle receiver 380 may be connected to the vehicle controller 360. The on-board vehicle receiver 380 may preferably be in wireless communication (384) with a handheld remote transmitter 382 to enable operative control of the vehicle section 520.

Use of the handheld remote transmitter 382 with the carriage assembly section 530 of the fusion machine illustrated herein may be optional because, in the present illustrated embodiment, it is preferred to require the operator to interface directly with the fusion machine for those steps and interventions in the operative sequences to be performed by the operator. Thus, the carriage assembly 530 is not operable from the handheld remote transmitter 382 in the embodiment illustrated in FIGS. 7, 8 and 9. In some other implementations, however, the handheld remote transmitter 382 may also enable operative control of the carriage section 530 of the fusion machine 350.

Continuing with FIG. 7, operative components connected to the carriage controller 390 include electrical controls 396, a carriage display 398, pressure sensors 402, and hydraulic valves 420. Position sensors 406 and keypads 408 may also be connected via the CAN 400 to the carriage controller 390. The keypads 408 may be a single unit or functionally separate as shown in FIG. 7 with a fixed jaw keypad 410, a movable jaw keypad 412, and a pipe lift keypad 414. The pressure sensors 402 are connected to the hydraulic lines (not shown) that operate the hydraulic cylinders (not shown) powered by the hydraulic pumps (not shown) to provide the motion of the carriage assembly 530. The position sensors 406 may be configured to indicate the positions of structure shown in FIG. 9 including the carriage 602, the movable jaws 608, 610, and the pipe lift mechanisms 634, 636 as shown in FIG. 9. The keypads 408 provide for entering commands to control the fixed jaws 604, 606, the movable jaws 608, 610, and the pipe lift mechanisms 634, 636. The carriage display 398 may provide, for example, operative prompts, status indicator data, and set-up data related to the operations of the carriage, particularly while the fusion machine 350 is actively joining two sections of polyethylene pipe together.

FIGS. 8 and 9 illustrate two views of one embodiment of a mobile butt fusion machine 500 suitable for practicing the present invention described herein. Reference numbers identify structural components used to perform certain steps of the butt fusion process described previously with respect to FIGS. 1 through 6. The butt fusion machine 500 is configured to support the ends of polyethylene pipe sections to be joined together, providing a permanent joint through a process that faces the ends of the pipe sections, heats them to a prescribed temperature, forces them together under a prescribed pressure for a predetermined time to bond the ends of the pipe sections together, allow them to cool for a prescribed time before releasing the pressure and decoupling the machine from the joined pipe.

FIG. 8 illustrates a pictorial view of the vehicle section 520 of one embodiment of a butt fusion machine 500 for practicing the claimed invention. The vehicle section 520 includes the vehicle chassis 502, a vehicle body 504, an engine enclosure 506 that encloses an engine 508 (not shown) to provide motive power for the fusion machine 500. The engine may be an internal combustion engine operable on gasoline, diesel fuel, or, in other embodiments, liquid or compressed natural gas, or other suitable fuel. Electrical power for the engine 508 may be supplied by a 12-volt automotive battery located within the engine enclosure 506. In some embodiments, motive power may be provided by electric motors operated from batteries.

The vehicle section 520 may further include one or more hydraulic pumps 640 (not shown) located within the body 504 adjacent the carriage in the embodiment shown in FIG. 8. A network of hydraulic lines (not shown), an on-board vehicle controller 360, and the on-board vehicle receiver 380 (not shown) may also be located within the vehicle section 520. The vehicle receiver 380 may be a radio control receiver adapted to communicate with the handheld remote transmitter 382 shown in the block diagram of FIG. 7. Other components of the fusion machine 500 include vehicle paddle levers 364 used to provide control of the vehicle tracks of the vehicle chassis 502 for controlling and steering the fusion machine 500. The vehicle display 368 is located next to the vehicle paddle levers 364 on the body 504 of the fusion machine 500.

Also visible in FIG. 8 are indexer pivots 510 and indexer position sensors 512 for operating the facer 620 and the heater 630. The facer 620 and the heater 630 are pivoting structures (and part of the carriage assembly 530 to be described) that may be swung into position between the ends of the PE pipe sections to be joined or swung out of the way when not in use. The facer 620 and heater 630 pivot about an indexer pivot 510. The indexer position sensor 512 may be used to fix or indicate the linear position of the facer 620 and heater 630 during operation of the fusion machine 350, while the angle sensors 516 and 518 are used to indicate the angular positions of them. In some embodiments a separate indexer (not shown) for the facer 620 and a separate indexer (not shown) for the heater 630 may be used. Other structures visible in FIG. 8 include fixed jaws 604, 606 and movable jaws 608, 610. An upper portion of the facer 620 is shown next to the fixed jaw 606 and the heater 630 appears between the facer 620 and the fixed jaw 604.

FIG. 9 illustrates a pictorial view of the carriage assembly section 530 of the embodiment of the butt fusion machine 500 for practicing the claimed invention. The carriage assembly 530 includes a movable section 602 supported by the rails 612, which together form part of the carriage assembly 530 supported by the vehicle body 504 of the embodiment shown of the fusion machine 500. The movable section 602 of the carriage assembly 530 includes the moveable jaws 608 and 610 as well as several carriage control devices for controlling the carriage assembly 530 and the movable jaws 608, 610. The moveable jaws (i.e., third and fourth pipe clamps) 608, 610 may be adjusted as needed. The control devices may include a carriage controller 390, one or more carriage paddle levers 396, a carriage display 398, a carriage position sensor 406, and a movable jaw keypad 412.

The carriage section 530 of the fusion machine 500 in FIG. 9 includes the first and second fixed jaws (i.e., first and second pipe clamps) 604, 606 and a fixed jaw keypad 410 in the stationary section 602 of the carriage section 530, mounted on the structural support for the fixed jaws 604, 606. Disposed between the first 604 and second 606 fixed jaws are a facer 620, a heater 630 (including a protective heater cover 632), a pipe lift keypad 414, and an indexer paddle lever 514. Near each end of the carriage assembly 602 is a first pipe lift 634 and a second pipe lift 636 as shown in FIG. 9. The pipe lifts 634, 636 provide support for the pipe sections upon loading them into the carriage assembly 602 during set up and during the operation of the fusion machine 500. The pipe lifts 634, 636 may be operated using the pipe lift keypad 414.

The facer 620 and the heater 630 are pivoting structures that may be swung or rotated into position between the ends of the PE pipe sections to be joined or rotated out of the way into a stowed position when not in use. The facer 620 in the embodiment shown in FIG. 9 may be a large drum-style cutter with three or four blades on each side for truing or "facing" the ends of the pipe sections before fusing them to ensure that the ends are square (perpendicular to the longitudinal axis of the pipe) and to expose freshly cut pipe ends that will more readily respond to the butt fusion process for joining. The heater 630 in the embodiment shown in FIG. 9 may be a large cylindrical device with heating elements disposed between two circular heat plates for contacting the ends of the pipe sections when the carriage 602 is moved into position for heating the pipe ends. The heater 630 may be powered electrically by a generator (not shown) within the engine enclosure 506. The generator may be driven by the engine in the manner of a typical internal combustion engine.

As should be understood, a mobile, self-contained butt fusion machine that is operable in selectable automatic, semi-automatic, or manual modes and which presents a variety of complex operating and control circumstances has been described. Adding the semi-automatic mode substantially adds to the utility of the fusion machine, particularly in appropriately interfacing the actions of an operator at defined places in the operating sequences to the process steps involved in setting up the pipe sections in the machine, controlling the facing, heating, and fusion operations, and operating the machine during the cooling, release, and movement of the pipe. In this way, the semi-automatic mode substantially improves the functionality of the fusion machine.

The machine described herein combines a mobile vehicle that supports a carriage equipped with jaws to secure the pipe sections, a hydraulic pump and associated plumbing to operate the carriage, a facing device, a heating device, pipe lift devices to support the pipe, and a variety of operator controls linked to programmed controllers in the vehicle, the carriage, and the vehicle engine. The present invention, through careful engineering of the machine and the software tasked with providing for configuration and control solves the problems of smoothly interfacing the actions of an operator with these disparate complex structures in all three operating modes without error while maintaining the efficiency of the process. The result is a novel combination heretofore unavailable in the industry, and one that solves a long-sought need for efficient construction and installation of pipelines.

While the invention has been shown in only one of its forms, it is not thus limited but is susceptible to various changes and modifications without departing from the spirit thereof. For example, referring to FIG. 1, as one alternative variation, the steps 22, 32, and 42/44 for measuring the drag pressure may be performed as a single step after the step 14 "Run Set-up Sequence" and before the selection of the operating mode in step 16.

What is claimed is:

1. A multi-mode butt fusion machine for joining sections of polyethylene (PE) pipe, comprising:
   a carriage assembly powered by a hydraulic system embodied in the fusion machine;
   a carriage controller of the fusion machine operatively coupled to a carriage display and to at least one hand-operated control;
   a non-volatile memory in the carriage controller; and
   programmed instructions stored in the non-volatile memory including a set-up sequence of the carriage controller to prepare the carriage assembly for selectively operating the fusion machine in three independently selectable manual, automatic, and semi-automatic modes for fusing PE pipe ends together in a heat fusion process; wherein
   selection of the semi-automatic mode includes a sequence of steps of the programmed instructions having at least one step of requiring intervention by an operator before resuming execution of the sequence of steps.

2. The butt fusion machine of claim 1, wherein:
   the sequence of steps of the programmed instructions includes defined intervention steps to enable operator action selected from the group consisting of confirming at least drag pressure and temperature settings, and confirming bead up, heat soak, fuse cool, and fusion end steps of the heat fusion process.

3. The butt fusion machine of claim 1, wherein the carriage assembly comprises:
   a stationary section and a movable section aligned along a common longitudinal axis, wherein the stationary section includes a facer for truing pipe ends and a heater for heating pipe ends;
   a first and a second pipe clamp for holding an end of a first section of PE pipe are supported in the stationary section;

a third and a fourth pipe clamp for holding a second section of PE pipe are supported in the movable section; and each pipe clamp is formed by first and second semicircular jaws hinged at one end thereof such that opposite ends may open and close around a section of PE pipe; wherein the movable section is configured to move the section of PE pipe toward and away from the first section of PE pipe under the control of the carriage controller.

4. The butt fusion machine of claim 1, wherein the carriage controller comprises:

a microcontroller operable according to the programmed instructions for enabling selection and execution of the three independently selectable manual, automatic, and semi-automatic modes of the heat fusion process.

5. The butt fusion machine of claim 4, wherein the programmed instructions comprise:

a select mode step for selecting one of the three independently selectable manual, automatic, and semi-automatic modes; and an enter step, following the select mode step, to enable selection of one independently selectable manual, automatic, or semi-automatic mode.

6. The butt fusion machine of claim 1, wherein the set-up sequence comprises the steps of:

loading the pipe sections into the carriage assembly to perform the set-up sequence;

preparing the ends of the first and second sections of PE pipe for joining by the heat fusion process.

7. The butt fusion machine of claim 6, wherein the step of preparing the ends comprises the steps of:

facing the ends of the pipe sections to be joined using a facer device rotated into position between the ends of the pipe sections; and cleaning the pipe ends after they are faced to specification.

* * * * *

UNITED STATES PATENT AND TRADEMARK OFFICE
CERTIFICATE OF CORRECTION

| | | |
|---|---|---|
| PATENT NO. | : 12,162,226 B2 | Page 1 of 1 |
| APPLICATION NO. | : 18/107762 | |
| DATED | : December 10, 2024 | |
| INVENTOR(S) | : Alex Bueno et al. | |

It is certified that error appears in the above-identified patent and that said Letters Patent is hereby corrected as shown below:

On the Title Page

The attorney of record's name is misspelled. It should read as:
(74) Attorney, Agent, or Firm - Whitaker Chalk Swindle &Schwartz PLLC; Stephen S. Mosher Signed and Sealed this
Second Day of September, 2025

Coke Morgan Stewart
*Acting Director of the United States Patent and Trademark Office*